United States Patent
Jong

(10) Patent No.: US 6,260,153 B1
(45) Date of Patent: Jul. 10, 2001

(54) AUTOMATIC COMPENSATION CIRCUIT FOR NO MARGIN INPUT DATA

(75) Inventor: Jong Le Jong, Kunpo-Si (KR)

(73) Assignee: LG Information & Communications, Ltd. (KR)

( * ) Notice: Subject to any disclaimer, the term of this patent is extended or adjusted under 35 U.S.C. 154(b) by 0 days.

(21) Appl. No.: 09/217,088

(22) Filed: Dec. 21, 1998

(30) Foreign Application Priority Data

Dec. 30, 1997 (KR) ................................. 97-79473

(51) Int. Cl.$^7$ ........................................ G16F 3/00
(52) U.S. Cl. ................................................ 713/400
(58) Field of Search ............................ 713/400, 503; 327/141, 362

(56) References Cited

U.S. PATENT DOCUMENTS

| | | | |
|---|---|---|---|
| 5,517,146 | * | 5/1996 | Yamasaki ........................ 327/276 |
| 5,625,506 | * | 4/1997 | Dovek et al. ..................... 360/51 |
| 5,748,231 | | 5/1998 | Park et al. . |
| 6,009,534 | * | 12/1999 | Chiu et al. ....................... 713/503 |

\* cited by examiner

Primary Examiner—Thomas M. Heckler
(74) Attorney, Agent, or Firm—Long, Aldridge & Norman LLP

(57) ABSTRACT

An automatic compensation circuit for so-called "no margin input data" comprises no margin detecting means for receiving input data and detecting whether the input data has no margin by detecting whether the input data overlaps a clock, and no margin compensating means for compensating for a lack of margin between the input data and the clock by selecting either the input data or data having a proper margin with respect to the clock according to the result of the no margin detecting means.

14 Claims, 4 Drawing Sheets

AUTOMATIC COMPENSATION CIRCUIT FOR NO MARGIN INPUT DATA

BACKGROUND

1. Technical Field

The present invention relates in general to an automatic compensation circuit for "no margin input data" and a clock capable of recognizing the input data normally, in the case that the clock and the data do not have any margin when reading the first data with a clock, and in case that data is inputted without any synchronized clock during designing Application Specific Integrated Circuit (ASIC) or Programmable Gate Array (PGA).

2. Background

Generally, a margin between a clock and input data is a time difference between the clock and the data edge. The margin between the clock and the data is required to read the input data exactly.

If input data has an incorrect location for synchronizing with a clock, and in particular has no margin with respect to the clock (hereinafter, referred to as "no margin input data") when the input data is read, it is required to read the data after matching the data to the clock automatically.

Particularly, the margin between the data and the clock is quite important in an express data processing system (such as, DS-3), and it is required to synchronize the data having no connection with the margin.

When reading input data first for internal logic routing, like for a conventional PGA, a user should check the margin and determine phases between the input data and the clock with the oscillator. And in the case of no margin input data, the user reads the data with the positive or trailing edge where the margin exists.

But, whenever routing an internal logic circuit of a PGA, the circuit routing logic path is different. That is why it is difficult to read the data with the positive or trailing edge after determining the phase of the difference between the data and the clock which is changed.

SUMMARY

Accordingly, the present invention is provided to solve the problems. An object of the present invention is to provide an automatic compensation circuit for no margin data, capable of matching input data with a PGA internal clock, in which the data input to the PGA has an incorrect location for synchronizing with the clock, particularly has no margin with the clock after detecting the data.

One embodiment of the present invention to achieve the object provides an automatic compensation circuit for no margin input data, comprising no margin detecting means for detecting whether input data is input with no margin by checking whether the input data is detected to be overlapped on a system reading clock, and no margin compensating means for compensating for a lack of margin between the input data and the reading clock by selecting one of the no margin data and data having a proper margin according to a detected result of the no margin detecting means.

Another embodiment of the present invention to achieve the object provides an automatic compensation circuit for no margin input data, comprising no margin detecting means for detecting whether input data having no margin with respect to a system reading clock is input or not after checking overlapped data, input data reading means having different data transmission paths according to whether the margin between the input data and the reading clock exists or not, and no margin compensation means for compensating for a lack of margin between the reading clock and the input data by selecting one of the two reading paths automatically according to a detected result of the no margin detecting clock. Other technical advantages are readily apparent to one skilled in the art from the following figures, descriptions, and claims.

BRIEF DESCRIPTION

Other objects, features and advantages of the present invention will become more apparent from the following detailed description when read in conjunction with the accompanying drawings, in which.

DETAILED DESCRIPTION OF THE PREFERRED EMBODIMENTS

Embodiments of the invention will be described with reference to the figures.

Figure 1:
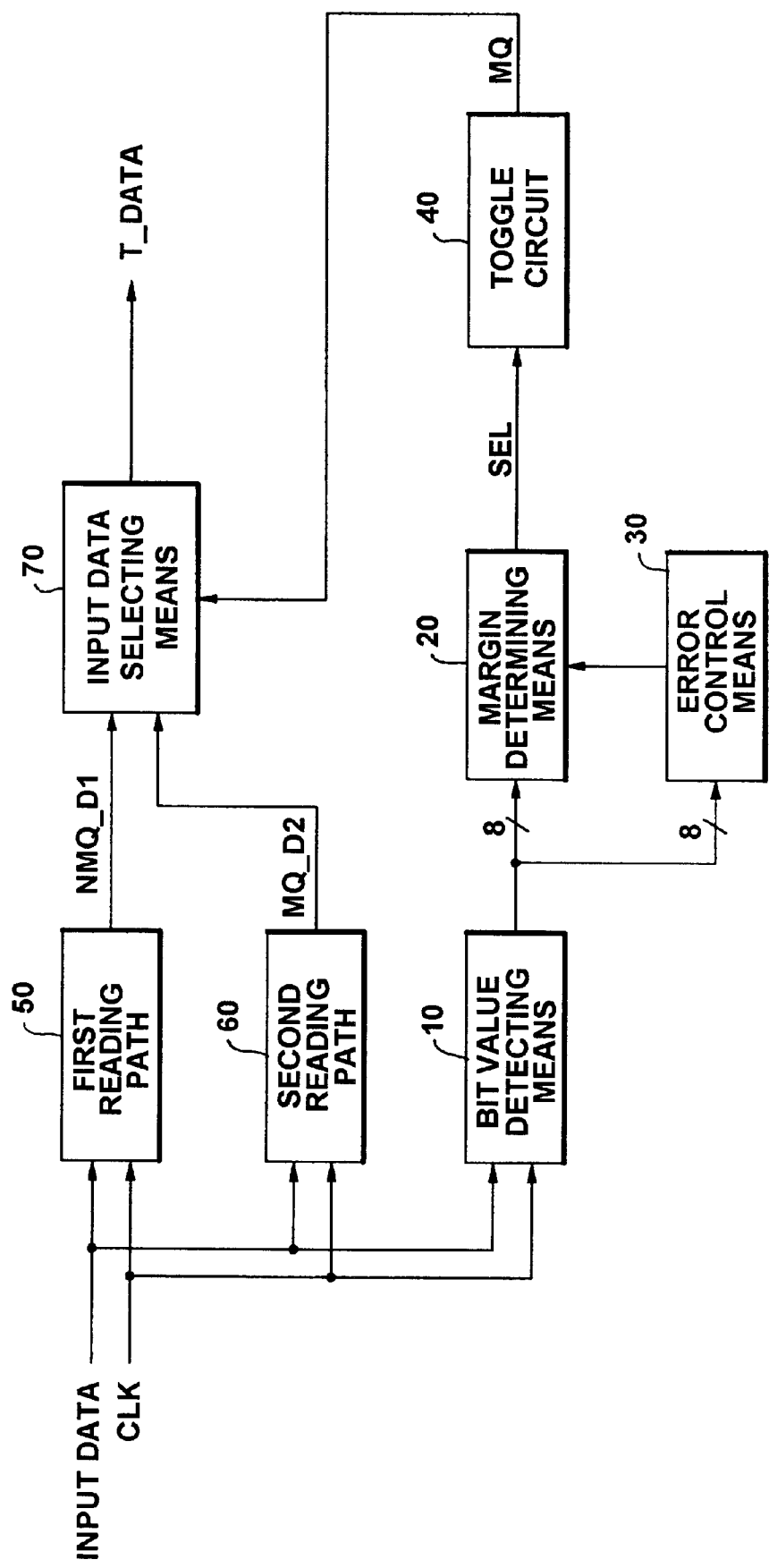
FIG. 1 is a block diagram of an automatic compensation circuit for no margin input data according to the present invention.

FIG. 1 shows a block diagram of an automatic compensation circuit for no margin input data according to the present invention. It comprises no margin detecting means (FIG. 2) for detecting whether input data is input with no margin to a system read clock, and no margin compensation means (FIG. 3) for compensating for a lack of margin between the input data and the reading clock, after detecting it. The present invention is explained when data is input for PGA logic routing. But it is not limited to this embodiment of the present invention only, therefore, it is also capable of use in the case where a proper margin between the clock and the input data is required in the other systems.

The no margin detecting means comprises bit value detecting means 10 for detecting each bit value of the input data, margin determining means 20 for determining whether the margin exists or not, and error controlling means 30 for detecting that the input data all has a same logic value (all bit values are logic "1" or "0") and controlling an output of the margin determining means 20 according to the detecting result.

In addition, the no margin detecting means further comprises a toggle circuit 40 established by a feedback line, for continuing the no margin data which is detected at least one no margin to the output, in which one of an output signal is inputted again by connecting an input end to the output end.

The no margin compensation means comprises: a first reading path 50 for reading input data which has a margin between the reading clock and the input data; a second reading path 60 for reading no margin input data; and input data selecting means 70 for compensating for a lack of margin between the reading clock and the input data by selecting between the two reading paths of the no margin detecting means, and outputting the compensated input data as the PGA routing data.

Figure 2:
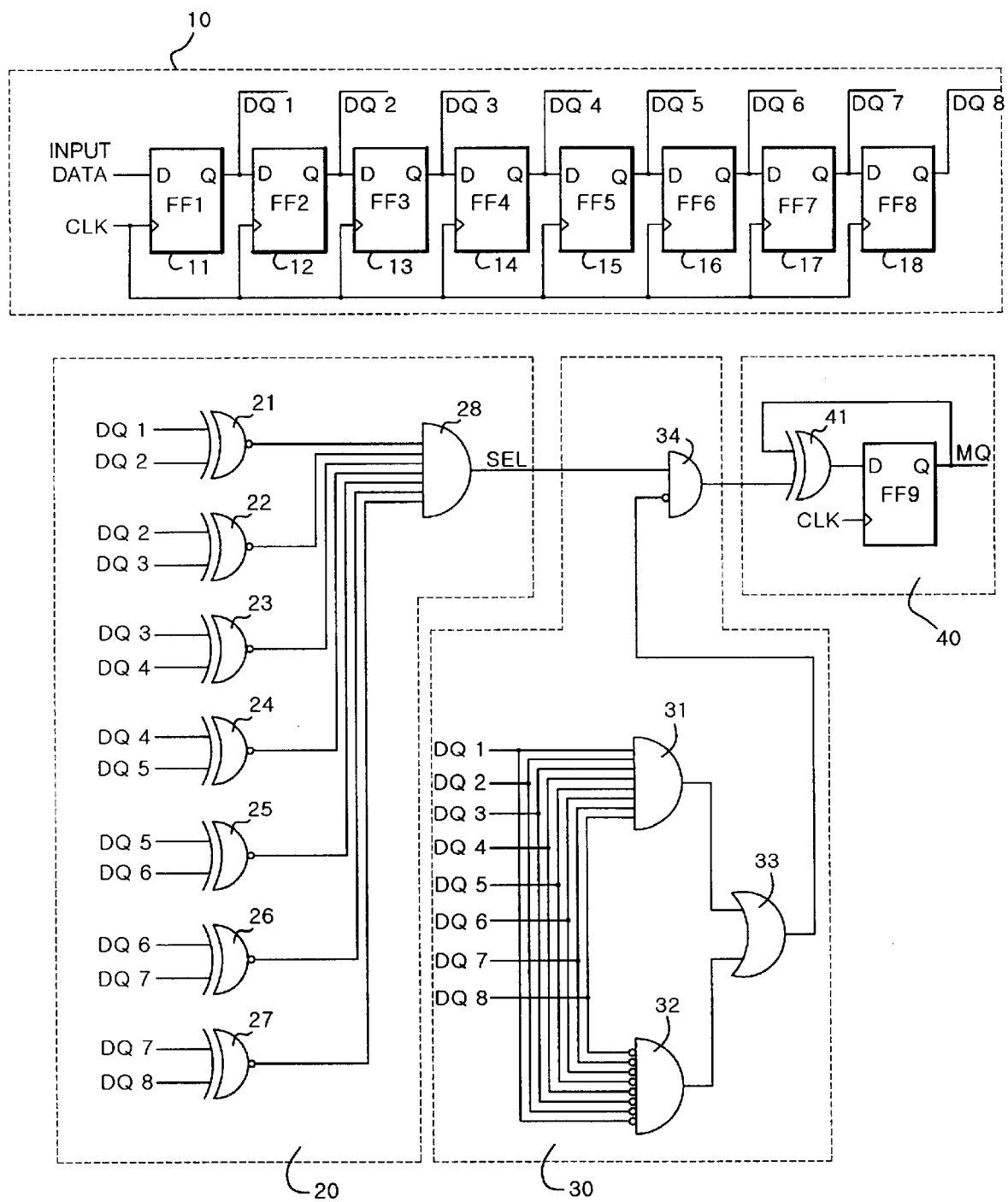
FIG. 2 is a circuit diagram of a portion of the no margin detecting means of FIG. 1 according to an embodiment of the present invention.

Referring to FIG. 2, the bit value detecting means 10 is comprised of a plurality of flipflops (FF1–FF8) for shifting the input data one clock cycle of the reading clock. Here, the number of the flipflops may be different according to the input data bits, and FIG. 2 is an example of 8-bit input data. And the detecting means 10 may be provided in order to detect each bit value (DQ1–DQ8) of the input data from an output end (D) of each flipflop (FF1–FF8).

The margin determining means 20 comprises a plurality of first logic gates 21–27 for comparing the bit values (DQ1–DQ8) detected from the output end of each flipflop, and a second logic gate 28 for detecting that no margin input data exists by taking all of first logic gate outputs.

Additionally, the error control means 30 comprises: a third logic gate 31 and fourth logic gate 32 for detecting a state in which the input data has all the same bits (each of the bits is "1" or "0") by comparing the bit values (DQ1–DQ8) detected in each flipflop; $5^{th}$ logic gate 33 for indicating a detecting result of two the gates as outputs; and $6^{th}$ logic gate 34 for controlling an output of the margin determining means by the output of the $5^{th}$ logic gate.

Referring to FIG. 2, the first logic gates 21–27 and the second logic gate 28 respectively, use exclusive NOR gate 1 less in number than the flipflops, and an AND gate for outputting a 1 in case that the output of the first logic gates are all logic high ("1") (in case that there is a no margin input data). And the third logic gate 31 to the $6^{th}$ logic gate 34, respectively, comprise: an AND gate 31 for outputting a "1" when all inputs are "1"; an inverted input AND gate 32 for outputting a "1" when all inputs are "0; " an OR gate 33 for outputting a "1" when at least one of the two gate outputs is a 1; and an AND gate 34 for controlling the output of the margin determining means with the inverted value ("0") when an output of the OR gate 33 is "1." Here, the margin determining means 20 and the error controlling means 30 may be used for the other logic circuit combination as well.

The toggle circuit 40 is comprised of an exclusive OR gate 41 for feedbacking one input signal from the output end, and a flipflop (FF9) connected to the exclusive OR gate 41. It is the same type as a T-flipflop for changing a current output logic whenever the input logic changes. It may be changed to any other type in the case of maintaining the detecting result of no margin with a correct state.

Figure 3:
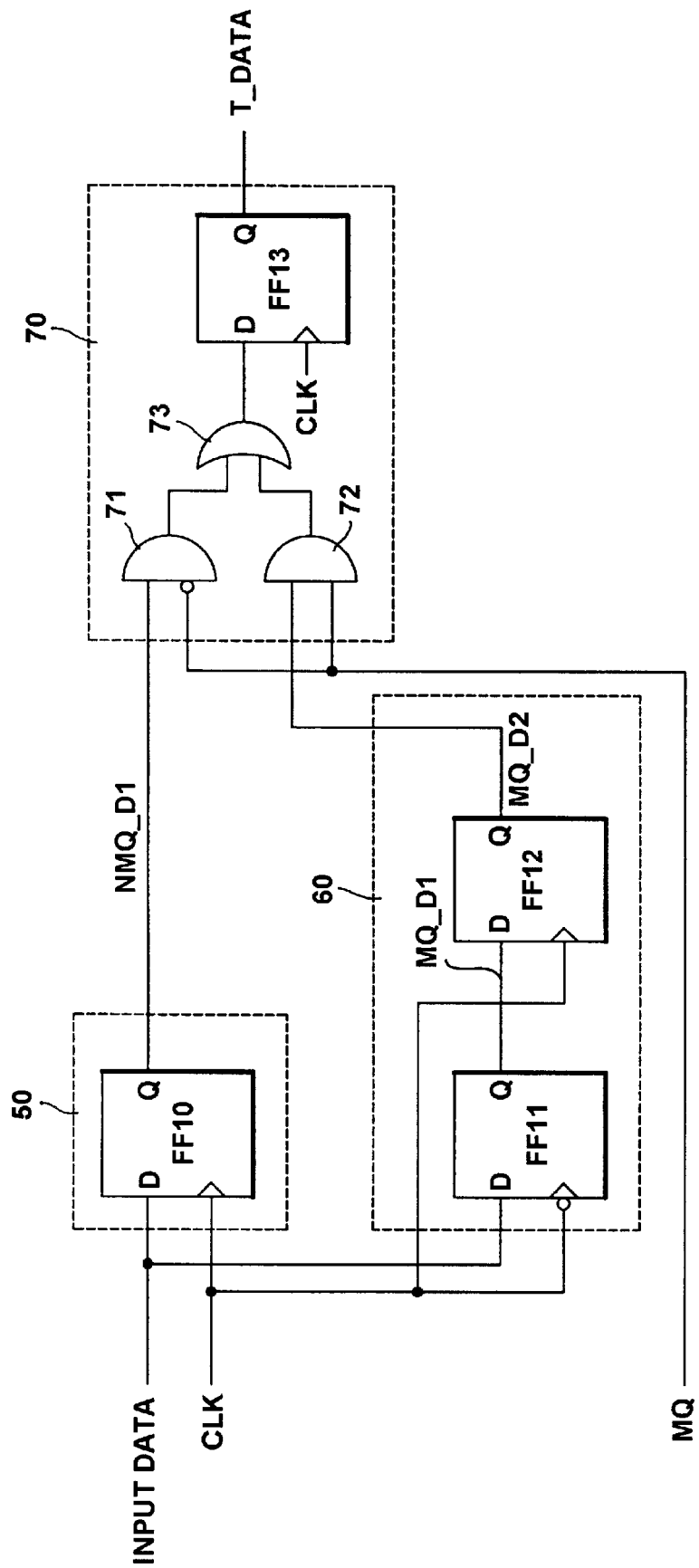
FIG. 3 is a circuit diagram of a portion of the no margin compensation means of FIG. 1 according to an embodiment of the present invention.

Referring to FIG. 3, the first reading path 50 may comprise a flipflop (FF10) for providing an output (NMQ_D1) delayed by 1 cycle from the input data by reading the input data at a positive edge of the reading clock (referring to CLK). And the second reading path 60 may comprise a flipflop (FF11) for an output (MQ_D1) delayed by a half cycle from the input data by reading the input data at a trailing edge of the CLK, and for preparing of input no margin data, and a flipflop (FF12) for an output (MQ_D2) delayed by 1 cycle from the input data by delaying the MQ_D1 one half cycle more by reading the MQ_D1 at the next positive edge.

Figure 4A:
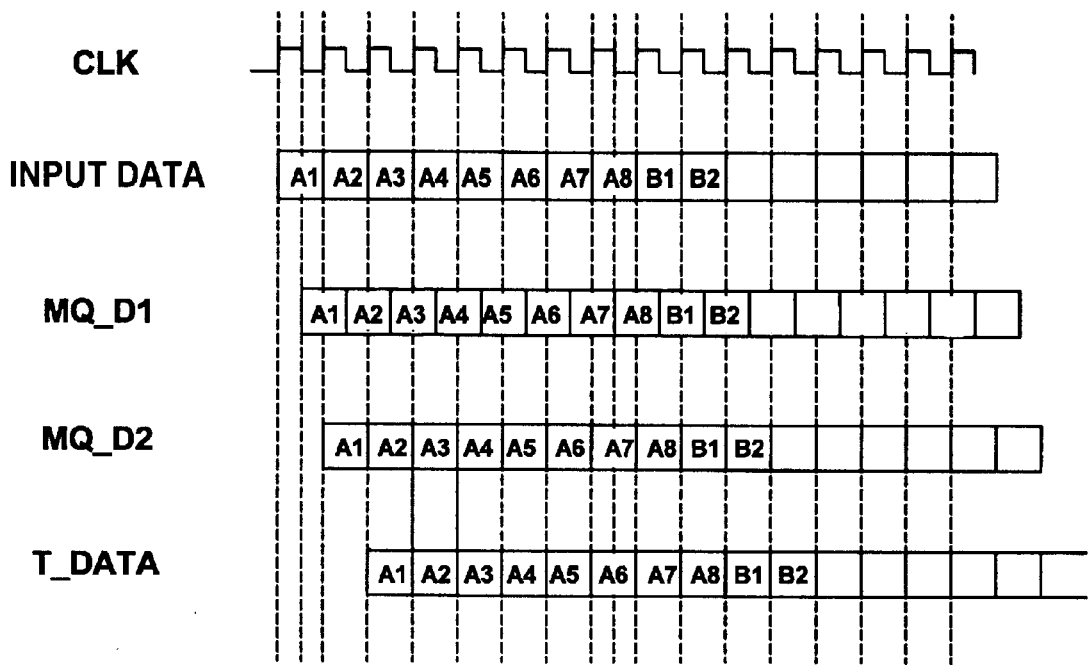
FIGS. 4a and 4b are output wave types of each part for 8-bit input data of FIG. 3.
Figure 4B:
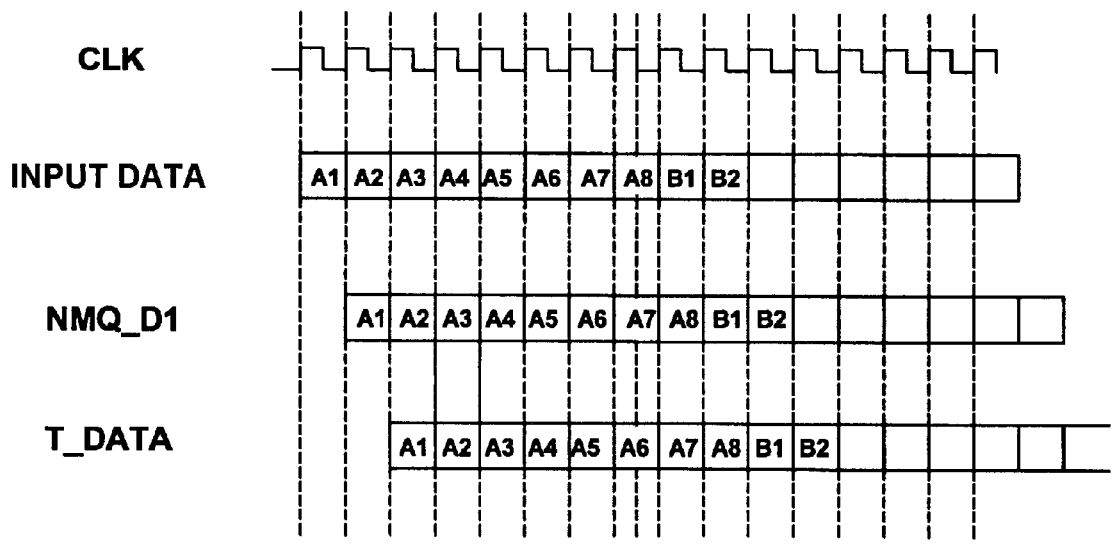

And, the input data selecting means 70 comprises: two AND gates 71, 72 for deciding an output by an output (MQ) of the no margin detecting means and an inverted value (M'Q') when receiving the data (NMQ_D1, MQ_D2) delayed through the two flipflops as inputs respectively; OR gate 73 for performing an "OR" operation of the outputs of the two AND gates 71, 72; and a flipflop 74 for outputting an output of the OR gate 73 by reading with the CLK. FIGS. 4a and 4b are output wave types of each part of the no margin compensation means for explaining each logic circuit.

The operation and effect of the present invention will now be explained in detail.

First, the no margin detecting means shifts the input data by one cycle using 8 D flipflops (FF1–FF8) in the bit value detecting means 10. Here, the shifted 8-bit input data (DQ1–DQ8) are checked as to whether the data (DQ1–DQ8) are the same as the data before, by using the first logic gates (EX-NOR) 21–27 in the margin determining means 20. Here, because the input data are read two times, with shifted data in case the no margin data exists, the data with the same value as the value of the previous step exists. Accordingly, the 7 outputs through the first logic gates (EX-NOR) 21–27 become logic high ("1") and therefore an output signal (SEL) of the second logic gate (AND) 28 becomes a logic high ("1").

Here, an error control unit 30 is required for preventing detecting the no margin input data when the SEL of the logic gate 28 is logic high ("1") in the case that all of input data are logic high ("1") or logic low ("0"). This state may be a normal state because margin between the input data and the CLK exists properly.

The error control means 30 detects that all of input data are a logic high ("1") or logic low ("0") by using the third logic gate (AND) 31, $4^{th}$ logic gate (AND) 32, and $5^{th}$ logic gate (OR) 33 for all of the shifted 8 bit input data (DQ1–DQ8) (in case that the output of OR gate 33 is a "1", referring to FIG. 2). And the error control means 30 inverts the output of the OR gate 33 and applies the inverted value to the $6^{th}$ logic gate (AND) 34. An output of the $6^{th}$ logic gate 34 maintains the logic low ("0") because the output of the $5^{th}$ logic gate (OR) gate has a logic high ("1") in case that all of input data are a logic high ("1") or logic low ("0"), even though the select signal (SEL) of the second logic gate 28 is a logic high ("1"). Accordingly, the error control means 30 may detect without an error, in order that the no margin detecting means (MQ) becomes logic high ("1") when the shifted input data are all the same by the no margin.

And the no margin detecting means uses the toggle circuit 40 for feedbacking the no margin detecting signal (MQ) at the output end of the means. So the no margin detecting means has a record that at least one of no margin is detected by making the no margin detecting signal (MQ) of the next step. Here, the "MQ" value decides whether no margin exists between the input data and the positive edge of the reading clock.

Next, the no margin compensation means creates output data (NMQ_D1), referring to FIG. 4b, by reading the output data at the reading clock positive edge using a flipflop (FF10) in the first reading path 50 for the data which has a proper margin between the reading clock and the input data. But the NMQ_D1 data becomes abnormal because there is little margin between the clock reading the data and the input data and the same data is sometimes read twice when a lack of margin happens. The no margin compensation means reads the input data at the trailing edge and the positive edge of the reading clock using two flipflops (FF11, FF12) for acquiring correct data in the second reading path 60, and creates output data (MQ_D2) referring to FIG. 4a. Here, there is little margin between the reading clock and the input data.

And input data selecting means 70 receives output data as a single input, in which the two logic gates 71, 72 create output data on the two paths respectively. Here, the no margin detecting signal (MQ) is inputted to the two logic gates 71, 72 with the inverted values (MQ, M'Q') respectively. Accordingly, the outputs of two logic gates 71, 72 are switching-outputted by the MQ and one of the switched outputs is applied to a next logic gate 73. Consequently, an input end of a flipflop (FF13) receives a correct input between the data from the two paths and the FF13 finally outputs routing data (T-DATA) by synchronizing the selected data with the reading clock's positive edge.

The no margin compensation means synchronizes the input data at the positive edge of the current reading clock for the input data having a proper margin with respect to the reading clock. And the no margin compensation means may output the routing data of a PGA by synchronizing the no margin input data with the reading clock at the trailing edge and the positive edge of the reading clock synchronizes according to the above operation of the present invention.

There is an advantage capable of matching the no margin input data to the clock automatically, by detecting the no margin input data, reading the no margin input data at the trailing edge of the clock and then at the positive edge again, and outputting the no margin input data by synchronizing the data at the positive edge of the clock, according to the present invention.

The present invention is not limited to the specifically disclosed embodiments, and variations and modifications may be made without departing from the scope of the present invention.

What is claimed is:

1. An automatic compensation circuit, comprising:
   no margin detecting means for receiving input data and detecting whether the input data has no margin by detecting whether the input data overlaps a clock; and
   no margin compensating means for compensating for a lack of margin between the input data and the clock by selecting one of the input data and data having a margin with respect to the clock according to a detected result of the no margin detecting means.

2. The automatic compensation circuit of claim 1, wherein the no margin compensating means synchronizes the input data to have a margin with the clock at a positive edge of the clock, and outputs the synchronized input data.

3. The automatic compensation circuit of claim 1, wherein the no margin compensating means synchronizes the input data to have a margin with the clock at a trailing edge and a subsequent positive edge of the clock, and outputs the synchronized input data.

4. The automatic compensation circuit of claim 1, wherein the no margin detecting means comprises:
   bit value detecting means for detecting a value of each bit of the input data; and
   margin determining means for determining whether the margin exists by comparing the detected value of each bit of the input data with a detected value of a previous bit.

5. The automatic compensation circuit of claim 4, wherein the no margin detecting means further comprises error control means for detecting whether the detected values of each bit of the input data are a same logic level and controlling an output of the margin determining means according to a detected result of the error control means.

6. The automatic compensation circuit of claim 4, wherein the no margin detecting means comprises a toggle circuit connected to an output of the margin determining means for establishing a feedback line to maintain a detected result of the no margin detecting means when no margin is detected at least once.

7. An automatic compensation circuit, comprising:
   no margin detecting means for receiving input data and detecting whether the input data has no margin by detecting whether the input data overlaps a clock; input data reading means having first and second data transmission paths; and
   no margin compensating means for compensating for a lack of margin between the input data and the clock by selecting one of the first and second data transmission paths according to a detected result of the no margin detecting means.

8. The automatic compensation circuit of claim 7, wherein the no margin compensating means synchronizes the input data to have a margin with the clock at a positive edge of the clock, and outputs the synchronized input data.

9. The automatic compensation circuit of claim 7, wherein the no margin compensating means synchronizes the input data to have a margin with the clock at a trailing edge and a subsequent positive edge of the clock, and outputs the synchronized input data.

10. The automatic compensation circuit of claim 7, wherein the no margin detecting means comprises:
    bit value detecting means for detecting a value of each bit of the input data; and
    margin determining means for determining whether the margin exists by comparing the detected value of each bit of the input data with a detected value of a previous bit.

11. The automatic compensation circuit of claim 10, wherein the no margin detecting means comprises a toggle circuit connected to an output of the margin determining means for establishing a feedback line to maintain a detected result of the no margin detecting means when no margin is detected at least once.

12. The automatic compensation circuit of claim 10, wherein the bit value detecting means shifts the clock by one clock cycle to detect the value of each bit.

13. The automatic compensation circuit of claim 12, wherein the margin determining means establishes a logic value for each bit of the input data according to value detected by the bit value detecting means.

14. The automatic compensation circuit of claim 13, wherein the no margin detecting means further comprises error control means for detecting whether the detected values of each bit of the input data are a same logic level and controlling an output of the margin determining means according to a detected result of the error control means.

* * * * *